(12) United States Patent
Belew et al.

(10) Patent No.: US 6,895,671 B1
(45) Date of Patent: May 24, 2005

(54) SYSTEM AND METHOD FOR REPAIRING A CONDUIT

(75) Inventors: Michael Shane Belew, Columbus, OH (US); Leon B. Dent, Brigham City, UT (US); Hossein Eslambolchi, Los Altos Hills, CA (US); John Sinclair Huffman, Conyers, GA (US)

(73) Assignee: AT&T Corp., New York, NY (US)

( * ) Notice: Subject to any disclaimer, the term of this patent is extended or adjusted under 35 U.S.C. 154(b) by 77 days.

(21) Appl. No.: 10/207,417

(22) Filed: Jul. 26, 2002

(51) Int. Cl.[7] ............................. B21F 13/00; H02G 1/12

(52) U.S. Cl. ............................. 30/90.4; 30/90.1; 81/9.4

(58) Field of Search ................................ 30/90.1, 90.2, 30/90.3, 90.4, 90.6, 90.7, 90.9; 81/9.4, 9.51

(56) References Cited

U.S. PATENT DOCUMENTS

| | | | | |
|---|---|---|---|---|
| 4,142,290 A | * | 3/1979 | Ducret | 30/90.9 |
| 4,787,144 A | * | 11/1988 | Krampe | 30/90.7 |
| 5,402,693 A | * | 4/1995 | Hoffa | 81/9.51 |
| 5,829,141 A | * | 11/1998 | Pick | 30/90.7 |
| 5,979,286 A | * | 11/1999 | Burth | 83/861 |
| 6,381,850 B1 | * | 5/2002 | Warner | 30/90.6 |
| 6,615,493 B2 | * | 9/2003 | Shevela | 30/90.1 |

* cited by examiner

*Primary Examiner*—Hwei-Siu Payer

(57) ABSTRACT

A metal tube slitter is presented. A housing includes a drive shaft for moving cable through the housing and a blade truck. The blade truck houses a blade used for penetrating the cable. A shoulder screw adjusts the blade truck and as a result adjusts the penetration of the blade into the cable. The drive shaft is attached to a drive knob. As the drive knob is rotated the drive shaft also rotates and moves the cable through the metal tube slitter. After the blade penetrates the cable, the blade cuts the cable as the cable is moved through the metal tube slitter by the drive shaft.

2 Claims, 12 Drawing Sheets

SYSTEM AND METHOD FOR REPAIRING A CONDUIT

BACKGROUND OF THE INVENTION

1. Field of the Invention

This invention relates to a repair apparatus. Specifically, the present invention relates to cable repair apparatus.

2. Description of the Prior Art

Communication and power systems are often the victim of circuit overloads or lightening strikes. The excess current and voltage caused by these various activities may destroy a significant amount of equipment and disrupt service for periods of time. As a result, ground wires (e.g., cable) are placed throughout these systems to protect against the potential damage that may be caused.

A ground wire consists of aluminum-clad steel wires surrounding an aluminum tube. Each aluminum-clad steel wire and aluminum tube runs the length of the ground wire. The aluminum tube (e.g. metal tube) is filled with fiber-optic cables. The fiber-optic cables are used for transmission of voice and data over communications networks. In the event of a fault such as a circuit overload or lightening strike, restoration of this type of system is very time-consuming and may cause difficulty in accessing the fiber-optic cables within the aluminum tube.

To gain access to the fiber-optic cables, a technician must remove the aluminum-clad steel wires with a heavy-duty wire cutter exposing the aluminum tube that houses the fiber-optic cable. An attempt is then made to remove the aluminum tube without damaging the fiber-optic cables inside. However, removing the aluminum tube without damaging the fiber-optic cables is difficult to accomplish. This process is very tedious and time-consuming; in addition, the conventional process often results in damaged fibers and requires that the process be done more than once to retain adequate fiber-optic cables for splicing.

Thus a method and apparatus is required that will facilitate access to the fiber optic cables housed in a ground wire. A method and apparatus is required which will prevent damage to the fibers and reduce the cycle time of operations that require access to fiber optic cable in a ground wire. A method and apparatus is required which would allow a technician to remove the aluminum tube and expose the fiber-optic cables with a single operation.

SUMMARY OF THE INVENTION

In one embodiment of the present invention, an apparatus comprises a housing for aligning a cable; a blade positioned within the housing; and a blade positioning mechanism, the blade positioning mechanism coupled to the blade and located within the housing, the blade positioning mechanism causing the blade to engage the cable when the blade positioning mechanism is adjusted.

In another embodiment, an apparatus comprises a housing for aligning a cable; a blade positioned mechanism positioned within the housing, the blade positioning mechanism including a blade and a movement mechanism, the movement mechanism positioning the blade to engage the cable by moving the blade positioning mechanism; and a drive shaft including a knob, the drive shaft positioned within the housing and engaging the cable, the drive shaft turning as the knob is turned and moving the cable through the housing, the blade engaging the cable and slitting the cable as the cable is moved through the housing.

In another embodiment of the present invention an apparatus comprises an alignment cavity receiving a cable; a blade truck positioned within the alignment cavity, the blade truck including a blade, the blade truck positioning the blade within the alignment cavity, relative to the cable; and a drive shaft positioned within the alignment cavity, the drive shaft moving the cable through the alignment cavity as the blade slits the cable.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
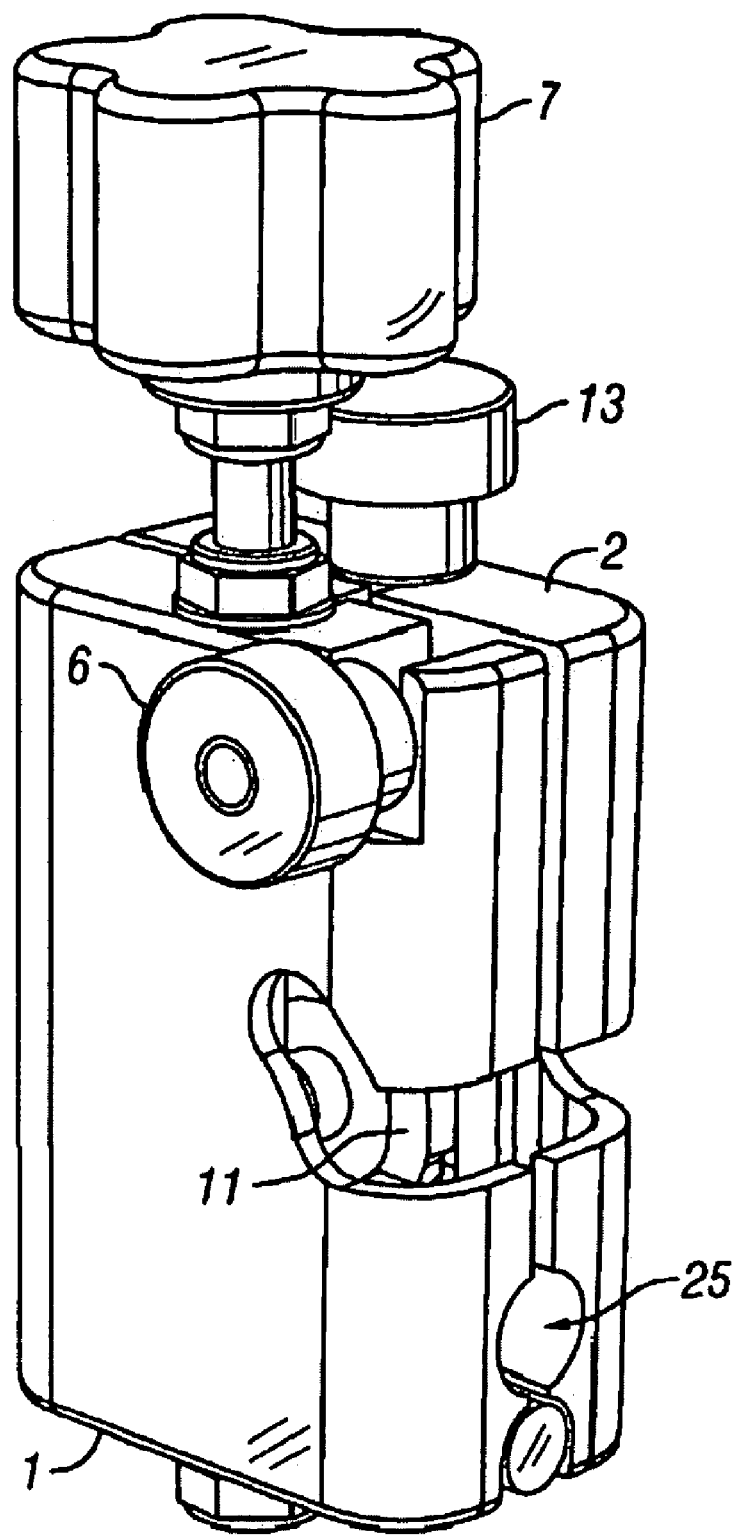
FIG. 1 displays a metal tube slitter implemented in accordance with the teachings of the present invention.

FIG. 1 displays a metal tube slitter implemented in accordance with the teachings of the present invention. In FIG. 1 a left half of the metal tube slitter is shown as 1 and a right half of the metal tool slitter is shown as 2. The left half of the metal tube slitter 1 and the right half of the metal tool slitter 2 are connected to form the body (e.g. housing) or casing of the metal tube slitter. A latch knob 6 is used to align the left half of the metal slitter 1 with the right half of the metal slitter 2. A ground wire is fed into the body (e.g. housing) of the metal tool slitter through a passageway shown as 25. The ground wire enters in the front of the body of the metal tool slitter and exits through the rear of the body of the metal tool slitter. A drive knob shown as 7 sits on top of a drive shaft 27. The drive shaft 27 turns as the drive knob 7 is turned. The drive shaft 27 makes contact with the ground wire and moves the ground wire through the body of the metal slitter as the drive knob 7 and the drive shaft 27 are turned. A blade shown as 11 makes contact with the ground wire, penetrates the ground wire and slits the ground wire along its length. The blade 11 is adjusted to a specific depth by a shoulder screw shown as 13. The shoulder screw 13 controls the depth of penetration of the blade 11 into the ground wire. As the shoulder screw 13 is adjusted up and down, a blade truck 3 moves upward and downward. As a result, the blade 11, which is connected to the blade truck 3 also moves upward and downward within the metal tube slitter. As such, the blade truck 3 functions as a blade positioning mechanism and the shoulder screw 13 functions as a blade adjustment mechanism, since the blade 11 is adjusted when the shoulder screw 13 is adjusted upward or downward. The drive knob 7 is then used to pull the ground wire through the body (e.g. 1 and 2) of the metal tube slitter. The blade 11 penetrates the ground wire and slits the metal tube housing the fiber-optic cable. It should be appreciated that while a specific housing (e.g. 1,2) of the metal tube slitter has been disclosed, alternative housing embodiments may be implemented and still remain within the scope of the present invention.

During operation, a ground wire is fed into a passageway 25 so that the ground wire makes contact with a drive shaft 27, which is controlled by the drive wheel 7. The shoulder screw 13 is used to lower the blade 11. The blade 11 is adjusted so that the blade 11 penetrates through the covering of the ground wire, through the aluminum clad steel wires and penetrates the metal tube housed within the ground wire. The blade 11 penetrates the metal tube enough to slit the metal tube, while avoiding damage to the fiber-optic cable housed within the metal tube. The drive knob 7 is then rotated. Rotating the drive knob moves the ground wire through the metal tube slitter. In addition, moving the ground wire through the metal tube slitter causes the blade 11 to slit the metal tube. The blade 11 rotates and cuts the metal tube as the ground wire is pulled through the metal tube slitter.

Figure 2:
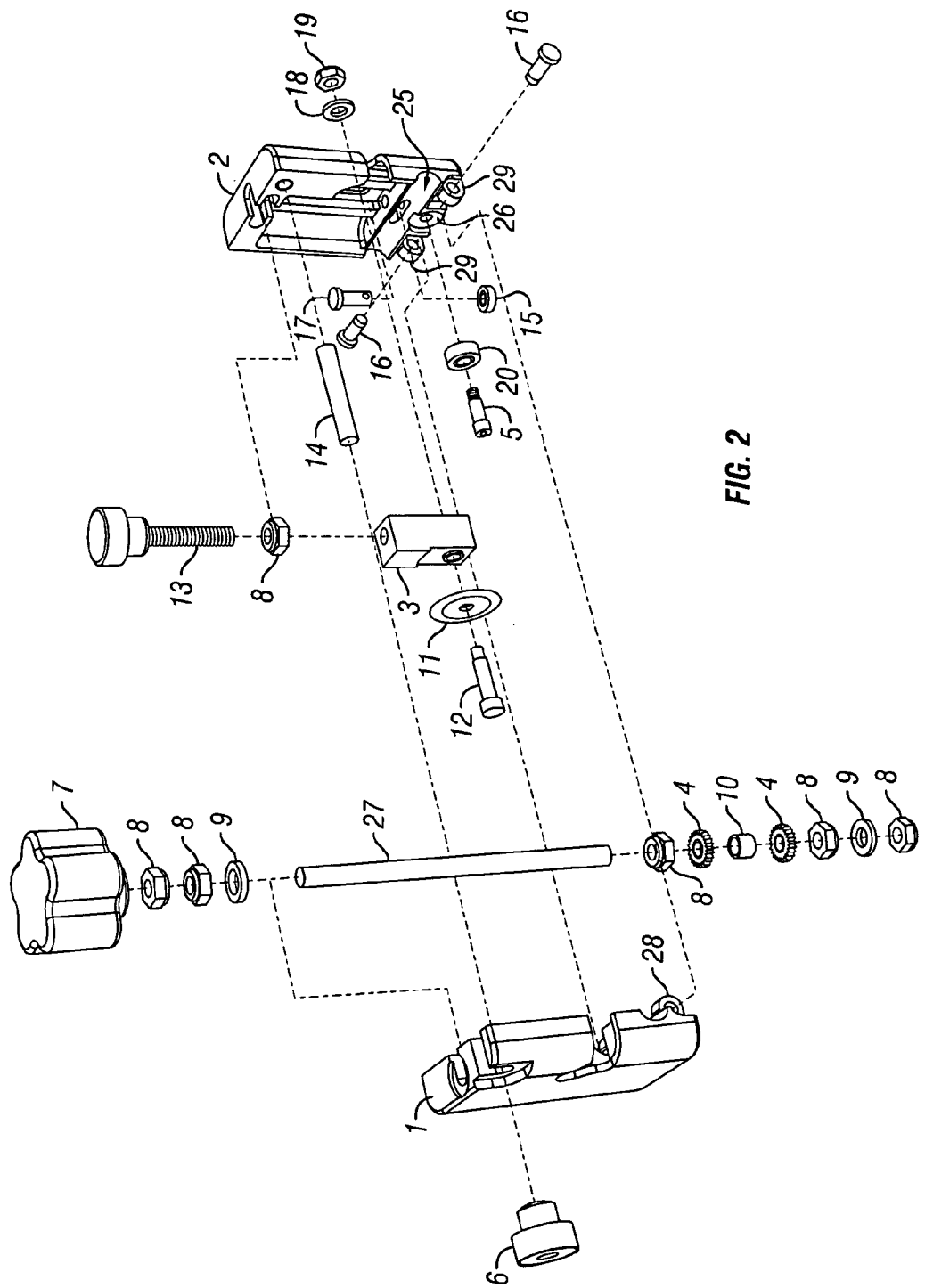
FIG. 2 displays an exploded view of the metal tube slitter implemented in accordance with the teachings of the present invention.

FIG. 2 displays an exploded view of the metal tube slitter implemented in accordance with the teachings of the present invention. The metal tube slitter implemented in FIG. 2 is one embodiment of the teachings of the present invention. The left half of the metal tool slitter 1 and the right half of the metal tool slitter 2 are shown. The right half of the metal tool slitter 2 includes a bearing housing 26 for retaining a bearing 20. The bearing 20 is positioned in the bearing housing 26 with a small bearing 15 and a bearing stud 5. The bearing 20 facilitates the movement of cable through the passageway 25. The right half of the metal tube slitter 2 includes right half alignment members 29. The right half alignment members 29 mate with left half alignment members 28 to help align the right half of the metal tube slitter 2 with the left half of the metal tube slitter 1. The right half of the metal tube slitter 2 also engages hinge pins 16 and bearing pins 17. The hinge pins 16 and bearing pins 17 are used to secure the right half of the metal tube slitter 2 to the left half of the metal tube slitter 1. When the right half of the metal tube slitter 2 and the left half of the metal tube slitter 1 are mated together, the right half alignment members 29 aligns with the left half alignment members 28 and the hinge pins 16 are inserted in the alignment members (28, 29) to align the right half of the metal tube slitter 2 with the left half of the metal tube slitter 1.

The right half of the metal tube slitter 2 and the left half of the metal tube slitter 1 are aligned by a stud 14. A latch knob 6 engages the stud 14 and is used to secure the right half of the metal tube slitter 2 to the left half of the metal tube slitter 1. A drive knob 7 is shown. The drive knob 7 is secured to a drive shaft 27 with locknuts 8 and a washer 9. The drive shaft 27 is further secured to the metal tube slitter on an oppositely disposed end from the drive knob 7 using securing mechanisms such as several locknuts 8, several cogs 4, a spacer 10 and a washer 9. However, it should be appreciated that any variety of connection mechanisms may be used to connect the drive knob 7, to the drive shaft 27 and the drive shaft 27 to the metal tube slitter (1, 2). The drive shaft 27 may take on a variety of forms, the drive shaft may be considered as any mechanism used to process (e.g., move) the cable through the metal tube slitter. For example, the drive shaft may include any shaft, spindle or other tool, which is manually controlled by an operator or automatically controlled by a motor or any combination of the two.

A blade truck 3 is shown. The blade truck 3 houses a blade 11. The blade 11 is secured to the blade truck using a shoulder screw 12 secured by a washer 18 and locknut 19. However, a large variety of mechanisms may be used to secure the blade 11 to the blade truck. A blade knob 13 is secured to the blade truck 3 using a locknut 8. Once the blade 11 is positioned in the blade truck 3, and the blade 11 and blade truck 3 are positioned within the metal tube slitter, turning the blade knob 13 moves the blade 11 upward and downward in a vertical direction within the housing of the metal tube slitter. As such, the blade knob 13 is used to insert the blade 11 into a cable at the correct depth. The blade truck 3 in combination with the turning knob 13 forms a blade positioning mechanism for positioning the blade 11. In the alternative, the blade truck 3, may serve as the blade positioning mechanism. While a specific embodiment of the blade truck 3 and the blade positioning mechanism 13 are displayed, the blade truck 3 and the blade turning knob 13 may take different forms. Functionally the blade truck 3 would include any device, which houses the blade and facilitates the adjustment of the blade, so that the blade impacts the cable. The turning knob 13, may take alternative forms such as a crankshaft or other movement mechanism for moving the blade truck.

Figure 3A:
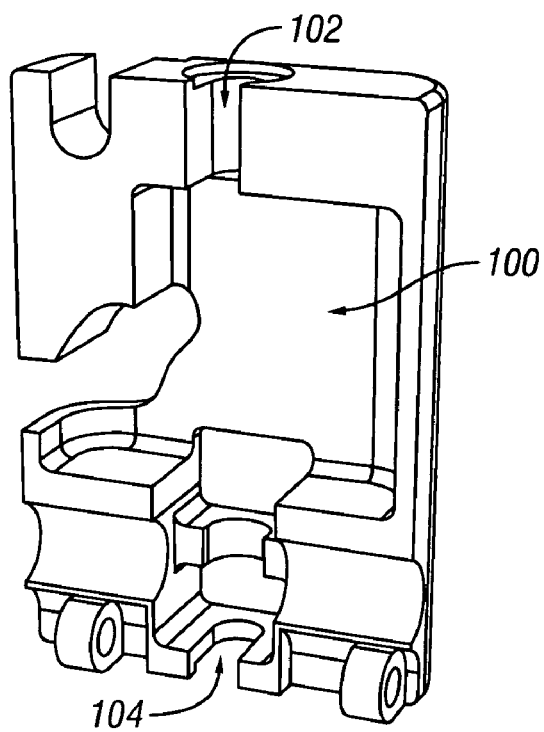
FIG. 3A displays a perspective view of a left half of the metal tube slitter shown in FIG. 1.
Figure 3B:
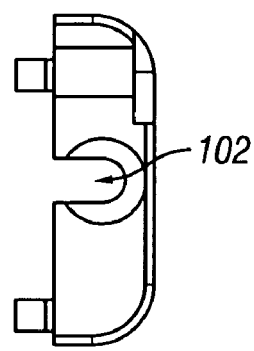
FIG. 3B displays a top view of the left half of the metal tube slitter shown in FIG. 1.
Figure 3C:
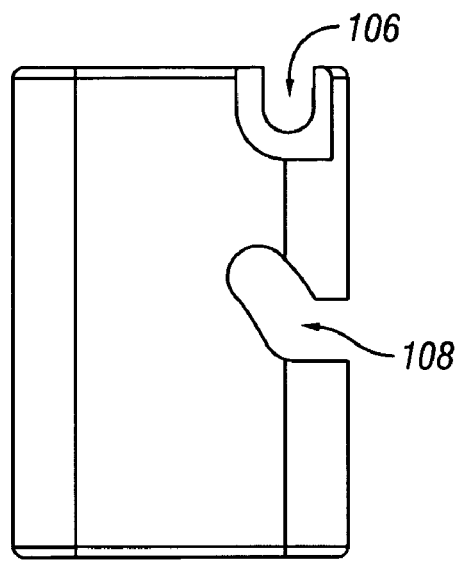
FIG. 3C displays an outside view of the left half of the metal tube slitter shown in FIG. 1.
Figure 3D:
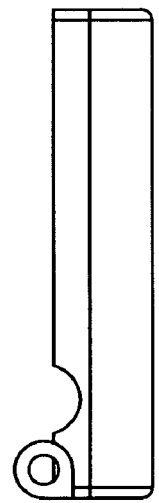
FIG. 3D displays a front view of the left half of the metal tube slitter shown in FIG. 1.
Figure 3E:
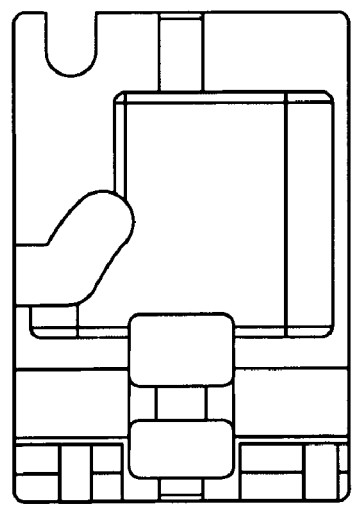
FIG. 3E displays an inside view of the left half of the metal tube slitter shown in FIG. 1.

FIG. 3A displays a perspective view of the left half of the metal tube slitter 1 shown in FIG. 1. A cavity is shown as 100. The cavity 100 is used to house the blade truck 3 of FIG. 2. When the left half of the metal tube slitter 1 is connected to the right half of the metal tube slitter 2, the cavity 100 in the left half of the metal tube slitter in conjunction with a similarly situated cavity in the right half of the metal tube slitter, combine to form an alignment cavity. The alignment cavity houses the blade truck and helps to align the blade truck. In addition, in one embodiment of the present invention the drive shaft may run through the alignment cavity. Openings 102 and 104 are used to house and align the drive shaft 27 of FIG. 2. FIG. 3B displays a top view of the left half of the metal tube slitter shown in FIG. 1. The opening 102 is also shown in FIG. 3B. The opening 102 constrains the drive shaft 27 of FIG. 1 so that the drive shaft is properly aligned and can engage a ground wire or cable, which is interjected into the passageway 25 (e.g., of FIG. 1) of the metal tube splitter. FIG. 3C displays an outside view of the left half of the metal tube slitter shown in FIG. 1. An opening 106 is used to guide the latch knob 6, which locks the left half of the metal tube slitter to the right half of the metal tube slitter. An opening 108, provides a visual passageway for an operator to view the blade and the blade trunk, as the blade lowers to cut the ground wire or cable. FIG. 3D displays a front view of the left half of the metal tube slitter shown in FIG. 1. FIG. 3E displays an inside view of the left half of the metal tube slitter shown in FIG. 1.

Figure 4A:
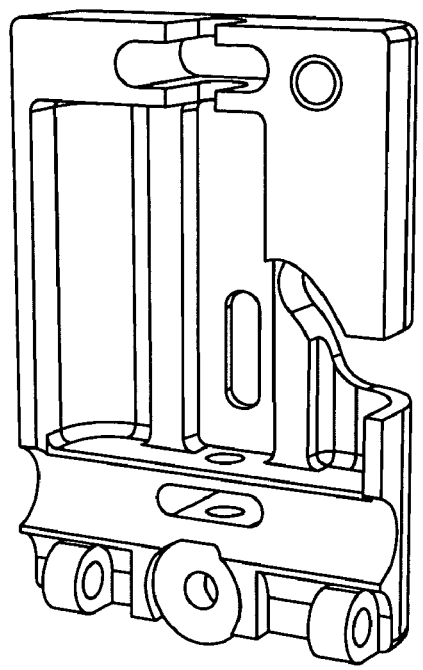
FIG. 4A displays a perspective view of a right half of the metal tube slitter shown in FIG. 1.
Figure 4B:
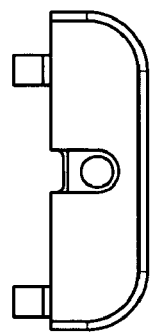
FIG. 4B displays a top view of the right half of the metal tube slitter shown in FIG. 1.
Figure 4C:
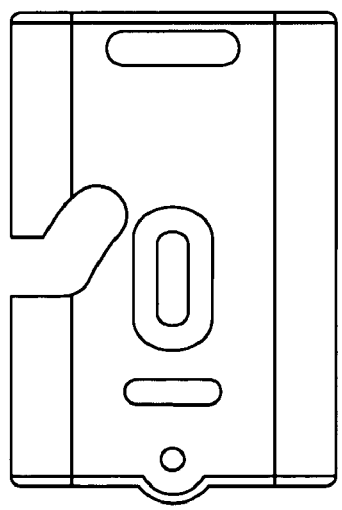
FIG. 4C displays an outside view of the right half of the metal tube slitter shown in FIG. 1.
Figure 4D:
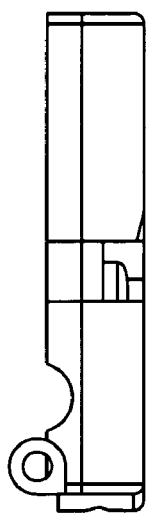
FIG. 4D displays a front view of the right half of the metal tube slitter shown in FIG. 1.
Figure 4E:
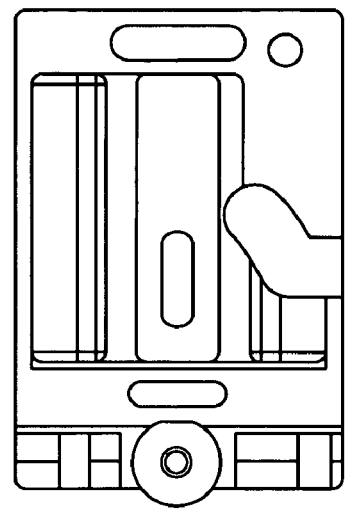
FIG. 4E displays an inside view of the right half of the metal tube slitter shown in FIG. 1.
Figure 4F:
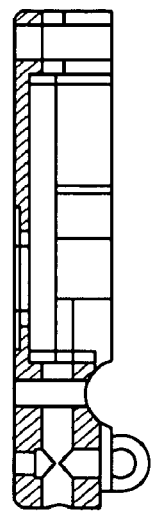
FIG. 4F displays a cross-sectional view of the right half of the metal tube slitter shown in FIG. 1.

FIG. 4A displays a perspective view of the right half of the metal tube slitter shown in FIG. 1. FIG. 4B displays a top view of the right half of the metal tube slitter shown in FIG. 1. FIG. 4C displays an outside view of the right half of the metal tube slitter shown in FIG. 1. FIG. 4D displays a front view of the right half of the metal tube slitter shown in FIG. 1. FIG. 4E displays an inside view of the right half of the metal tube slitter shown in FIG. 1. FIG. 4F displays a cross-sectional view of the right half of the metal tube slitter shown in FIG. 1.

Figure 5A:
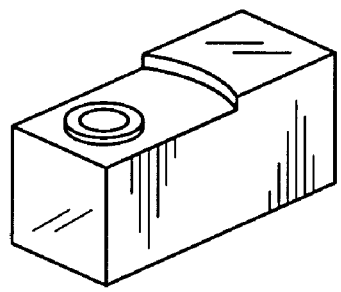
FIG. 5A displays a perspective view of a blade truck implemented in accordance with the teachings of the present invention.
Figure 5B:
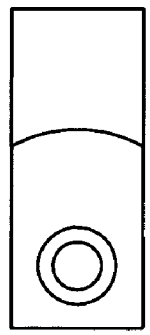
FIG. 5B displays a front view of a blade truck implemented in accordance with the teachings of the present invention.
Figure 5C:
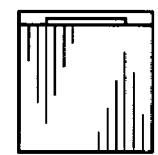
FIG. 5C displays a bottom view of a blade truck implemented in accordance with the teachings of the present invention.
Figure 5D:
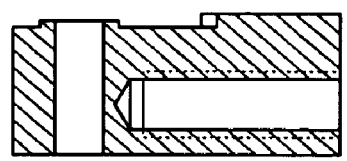
FIG. 5D displays a cross-sectional view of a blade truck implemented in accordance with the teachings of the present invention.
Figure 5E:
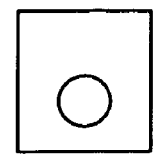
FIG. 5E displays a top view of a blade truck implemented in accordance with the teachings of the present invention.

FIG. 5A displays a perspective view of a blade truck implemented in accordance with the teachings of the present invention. FIG. 5B displays a front view of a blade truck implemented in accordance with the teachings of the present invention. FIG. 5C displays a bottom view of a blade truck implemented in accordance with the teachings of the present invention. FIG. 5D displays a cross-sectional view of a blade truck implemented in accordance with the teachings of the present invention. FIG. 5E displays a top view of a blade truck implemented in accordance with the teachings of the present invention.

Figure 6A:
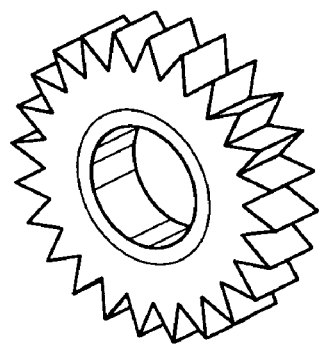
FIG. 6A displays a perspective view of cog implemented in accordance with the teachings of present invention.
Figure 6B:
FIG. 6B displays a side view of a cog implemented in accordance with the teachings of the present invention.
Figure 6C:
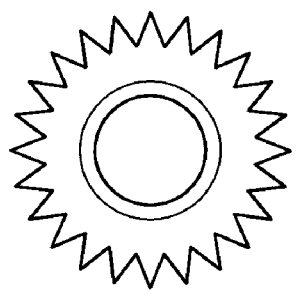
FIG. 6C displays a front view of a cop implemented in accordance with the teachings of the present invention.

FIG. 6A displays a perspective view of a cog implemented in accordance with the teachings of present invention. FIG. 6B displays a side view of a cog implemented in accordance with the teachings of the present invention. FIG. 6C displays a front view of a cog implemented in accordance with the teachings of the present invention.

Figure 7A:
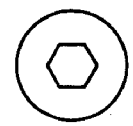
FIG. 7A displays a top end view of a bearing stud implemented in accordance with the teachings of the present invention.
Figure 7B:
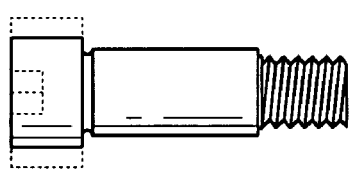
FIG. 7B displays a side view of a bearing stud implemented in accordance with the teachings of the present invention.

FIG. 7A displays a top end view of a bearing stud 5 implemented in accordance with the teachings of the present invention. FIG. 7B displays a side view of a bearing stud 5 implemented in accordance with the teachings of the present invention.

Figure 8:
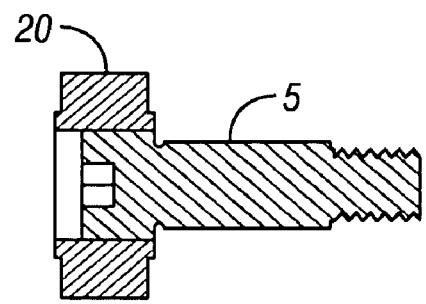
FIG. 8 displays an assembly implemented in accordance with the teachings of the present invention.

FIG. 8 displays a bearing stud assembly implemented in accordance with the teachings of the present invention. In FIG. 8 the bearing stud 5 of FIG. 2, is positioned within the bearing assembly 20 of FIG. 2.

Figure 9A:
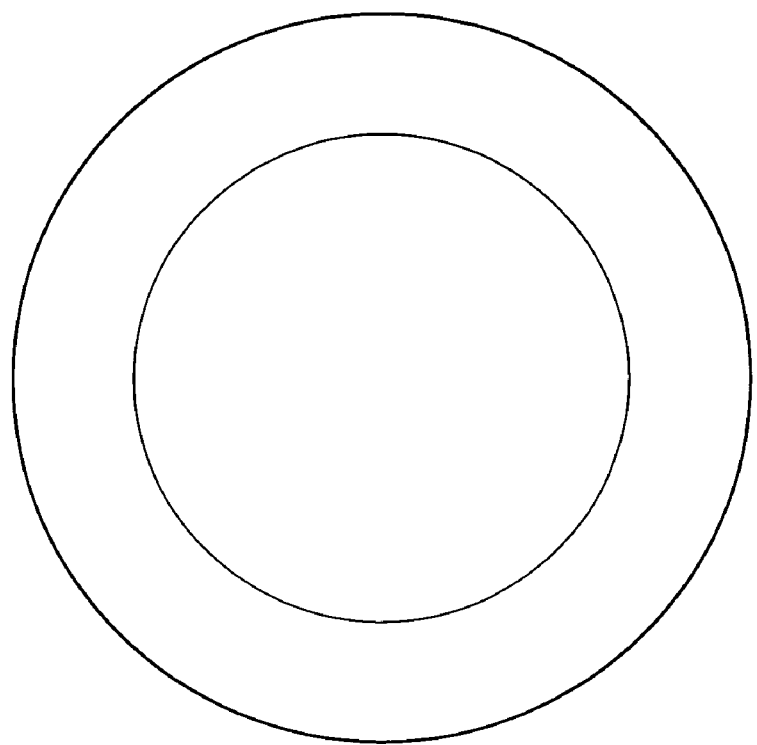
FIG. 9A displays a planar view of a rotary cutting blade implemented in accordance with the teachings of the present invention.
Figure 9B:
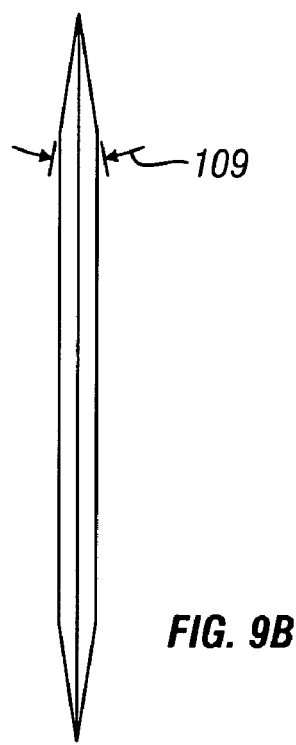
FIG. 9B displays a side view of a rotary cutting blade implemented in accordance with the teachings of the present invention.
Figure 9C:
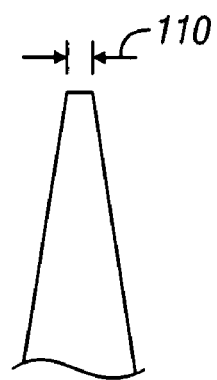
FIG. 9C displays an edge detail of a rotary cutting blade implemented in accordance with the teachings of the present invention.

FIG. 9A displays a planar view of a rotary cutting blade implemented in accordance with the teachings of the present invention. FIG. 9B displays a side view of a rotary cutting blade implemented in accordance with the teachings of the present invention. In one embodiment of the present invention an angle of 18 degrees is defined by 109. FIG. 9C displays an edge detail of a rotary cutting blade implemented in accordance with the teachings of the present invention. In one embodiment of the present invention the rotary cutting blade includes a diameter of 1.00 inch and a width of 0.050 inches. The edge detail shown as 110 includes a width of 0.002 inches. However, it should be appreciated that the rotary cutting blade may be scaled to a variety of dimensions without departing from the scope of the present invention.

Figure 10:
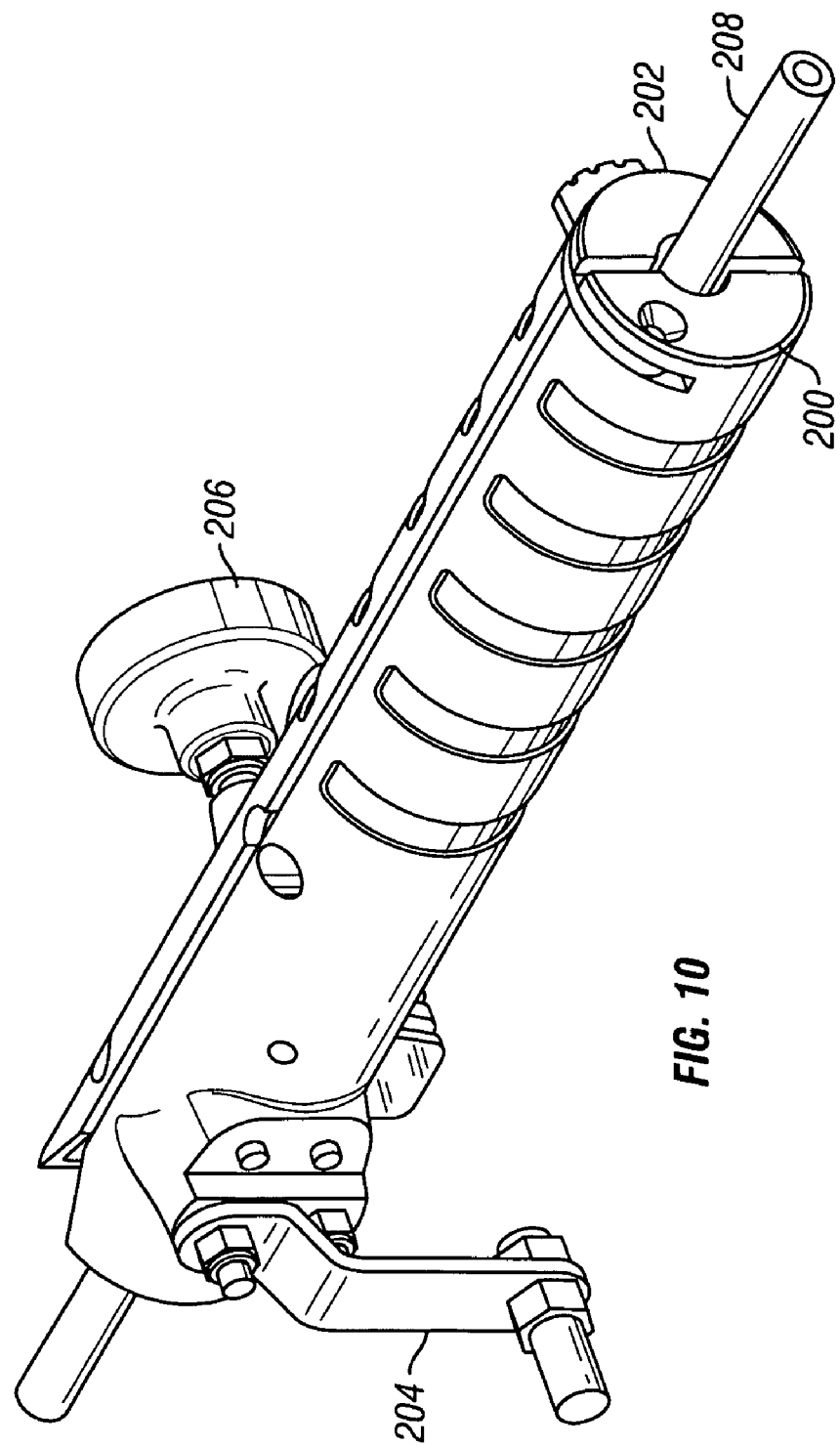
FIG. 10 displays a perspective view of an alternate embodiment of the present invention.

FIG. 10 displays an alternate embodiment of the present invention (e.g., a metal tube slitter). A left half of the metal tube slitter 200 and a right half of the metal tube slitter 202 encase a cable shown as 208. A handle of a driving apparatus shown as 204 is used to move the cable through the metal tube slitter. A drive knob is shown as 206. The drive knob 206 controls a drive truck (not shown), which houses a rotary cutting blade (not shown). As the drive knob is adjusted, the drive truck moves and as a result, the rotary cutting blade impacts (e.g., penetrates) a metal tube within the cable and slits the metal tube.

Figure 11:
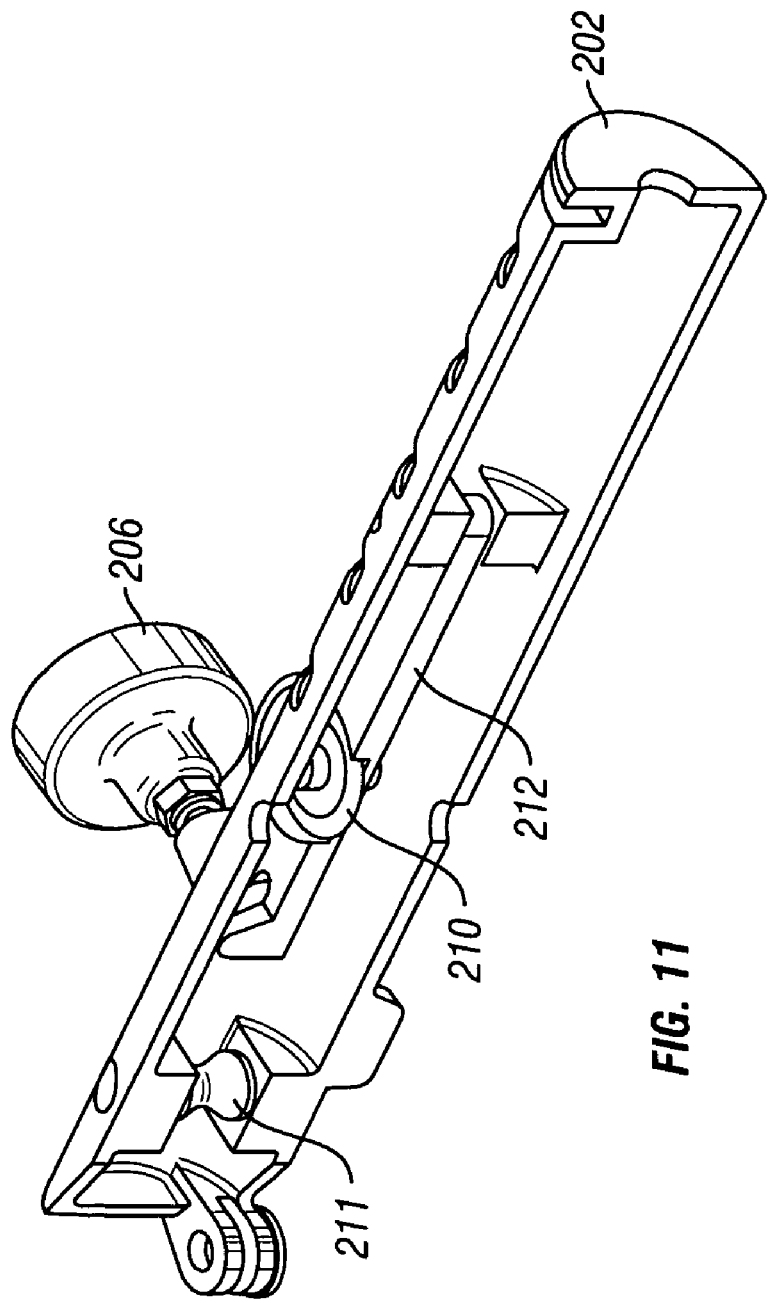
FIG. 11 displays a right side view of the alternate embodiment of the present invention.
Figure 12:
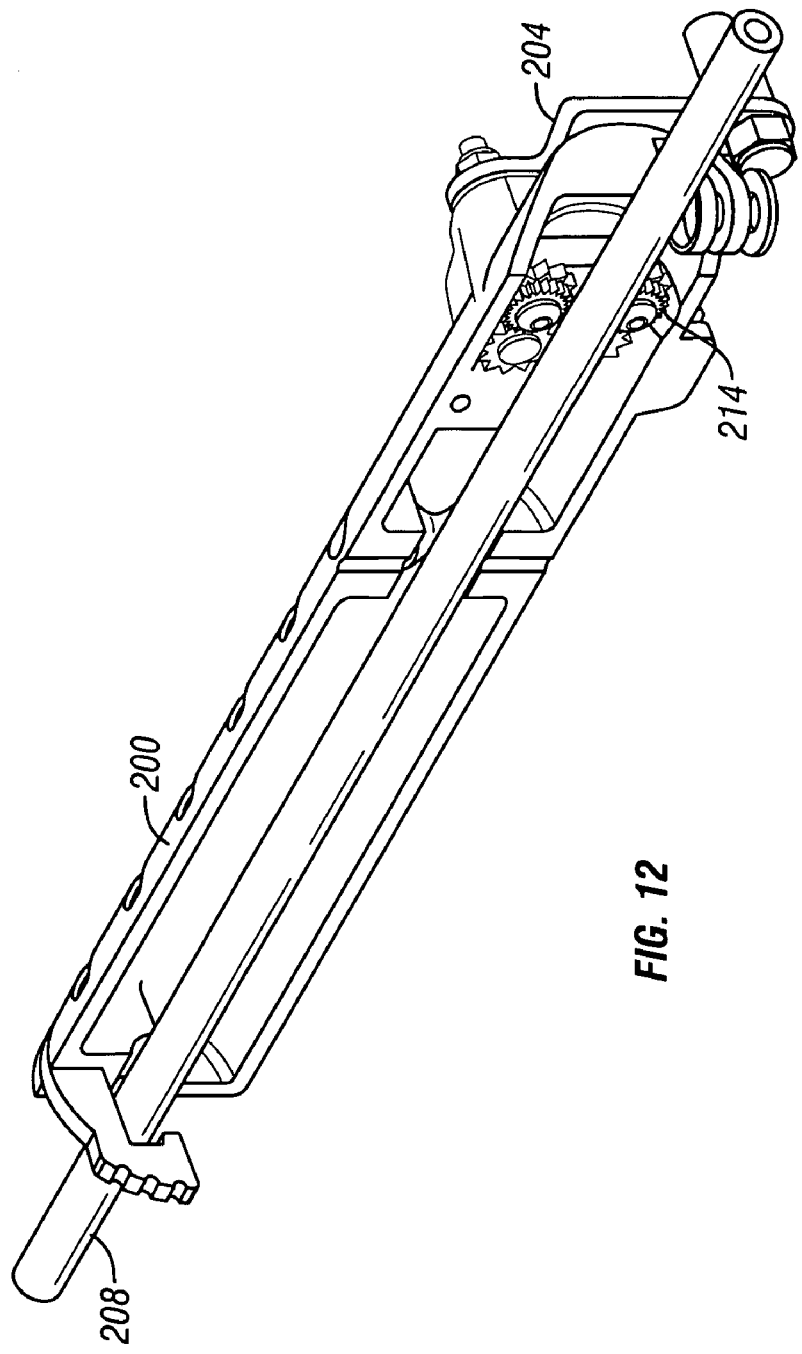
FIG. 12 displays a left side view of the alternate embodiment of the present invention.

FIG. 11 displays the right half of the metal tube slitter 202. A blade 210 is positioned within a blade truck 212. As the drive knob 206 is adjusted, the blade truck 212 moves the blade 210 inward to impact the cable and the metal tube. A spindle is shown as 211. The cable makes contact with the spindle, and the spindle turns as the cable moves through the metal tube slitter to help process the cable through the metal tube slitter. FIG. 12 displays the left half of the metal tube slitter 200. The cable is shown as 208. Cogs as shown in FIG. 6A are shown as 214. The Cogs help process the cable 208 through the metal tube slitter when the handle of the driving apparatus 204 is turned.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

It is therefore intended by the appended claims to cover any and all such applications, modifications and embodiments within the scope of the present invention.

What is claimed is:

1. An apparatus comprising:

a housing for aligning a cable;

a blade positioning mechanism positioned within the housing, the blade positioning mechanism including a blade and a movement mechanism, the movement mechanism positioning the blade to engage the cable by moving the blade positioning mechanism; and a drive shaft including a knob, the drive shaft positioned within the housing and engaging the cable, the drive shaft turning as the knob is turned and moving the cable through the housing, the blade engaging the cable and slitting the cable as the cable is moved through the housing.

2. An apparatus comprising:

an alignment cavity receiving a cable;

a blade truck positioned within the alignment cavity, the blade truck including a blade, the blade truck positioning the blade within the alignment cavity, relative to the cable; and a drive shaft positioned within the alignment cavity, the drive shaft moving the cable through the alignment cavity as the blade slits the cable.

* * * * *